(12) United States Patent
Buchner et al.

(10) Patent No.: US 6,535,854 B2
(45) Date of Patent: *Mar. 18, 2003

(54) SPEECH RECOGNITION CONTROL OF REMOTELY CONTROLLABLE DEVICES IN A HOME NETWORK ENVIRONMENT

(75) Inventors: Peter Buchner, Leonberg (DE); Silke Goronzy, Fellbach (DE); Ralf Kompe, Fellbach (DE); Stefan Rapp, Fellbach (DE)

(73) Assignee: Sony International (Europe) GmbH, Berlin (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/175,382

(22) Filed: Oct. 19, 1998

(65) Prior Publication Data
US 2002/0069063 A1 Jun. 6, 2002

(30) Foreign Application Priority Data
Oct. 23, 1997 (EP) .............................................. 97118470

(51) Int. Cl.[7] .............................................. G10L 15/22
(52) U.S. Cl. ............. 704/275; 379/102.01; 340/825.07; 340/825.25
(58) Field of Search ................................. 704/275, 270, 704/200, 231; 340/825.07, 825.25; 700/94; 379/102.03

(56) References Cited

U.S. PATENT DOCUMENTS 4,974,191 A * 11/1990 Amirghodsi et al. ........... 704/8
4,989,081 A * 1/1991 Miyaga ....................... 348/61
5,086,385 A * 2/1992 Launey et al. ................ 700/83

(List continued on next page.)

FOREIGN PATENT DOCUMENTS

| DE | 296 18 130 | | 2/1997 | ............. G10L/7/08 |
| EP | 0 516 210 | * | 2/1992 | ............. H04L/12/28 |
| EP | 0 747 881 | | 12/1996 | ............. G10L/7/10 |
| EP | 0 800 304 A2 | * | 10/1997 | ............. 379/88.03 |
| WO | WO 96/21990 | | 7/1996 | ............. G10L/9/00 |

OTHER PUBLICATIONS

Ingrid J. Wickelgren, "The Facts about FireWire," IEEE Spectrum, vol. 34, No. 4, Apr. 1997, pp. 19–25.*

(List continued on next page.)

Primary Examiner—Marsha D. Banks-Harold
Assistant Examiner—Donald L. Storm
(74) Attorney, Agent, or Firm—Frommer Lawrence & Haug LLP; William S. Frommer; Bruno Polito

(57) ABSTRACT

Home networks low-cost digital interfaces are introduced that integrate entertainment, communication and computing electronics into consumer multimedia. Normally, these are low-cost, easy to use systems, since they allow the user to remove or add any kind of network devices with the bus being active. To improve the user interface a speech unit (2) is proposed that enables all devices (11) connected to the bus system (31) to be controlled by a single speech recognition device. The properties of this device, e.g. the vocabulary can be dynamically and actively extended by the consumer devices (11) connected to the bus system (31). The proposed technology is independent from a specific bus standard, e.g. the IEEE 1394 standard, and is well-suited for all kinds of wired wireless home networks. The speech unit (2) receives data and messages from the device. The speech unit (2) recognizes speaker-dependent commands. A Speech synthesizer synthesizes messages. A remotely controllable device (11) has access to a medium which may be a CD-ROM. The device may ask for a logical name or identifier.

22 Claims, 13 Drawing Sheets

U.S. PATENT DOCUMENTS

| | | | | | |
|---|---|---|---|---|---|
| 5,317,693 | A | * | 5/1994 | Cuenod et al. | 710/9 |
| 5,341,166 | A | * | 8/1994 | Garr et al. | 348/10 |
| 5,420,573 | A | * | 5/1995 | Tanaka et al. | 340/88.24 |
| 5,530,896 | A | * | 6/1996 | Gilbert | 710/9 |
| 5,537,605 | A | * | 7/1996 | Teece | 712/1 |
| 5,774,628 | A | * | 6/1998 | Hemphill | 704/255 |
| 5,774,859 | A | * | 6/1998 | Houser et al. | 704/275 |
| 5,802,149 | A | * | 9/1998 | Hanson | 379/88.03 |
| 5,909,183 | A | * | 6/1999 | Borgstahl et al. | 340/825.22 |
| 5,915,001 | A | * | 6/1999 | Uppaluru | 379/88.22 |
| 6,018,568 | A | * | 1/2000 | Furman et al. | 379/88.03 |

OTHER PUBLICATIONS

Banks, David et al., "Breaking Open the Set Top Box," Multimedia Networks: Security, Displays, Terminals, and Gateways, Dallas TX, Nov. 4–5, 1997, pp. 105–111.*

Evans G. "Solving Home Automation Problems Using Artificial Intelligence Techniques", IEEE Transactions On Consumer Electronics, vol. 37, No. 3, Aug. 1, 1991, pp. 395–400, XP000263213.

"Data Retrieval Through A Compact Disk Device Having A Speech–Driven Interface" IBM Technical Disclosure Bulletin, vol. 38, No. 1, Jan. 1995, pp. 267/268, XP000498766.

* cited by examiner

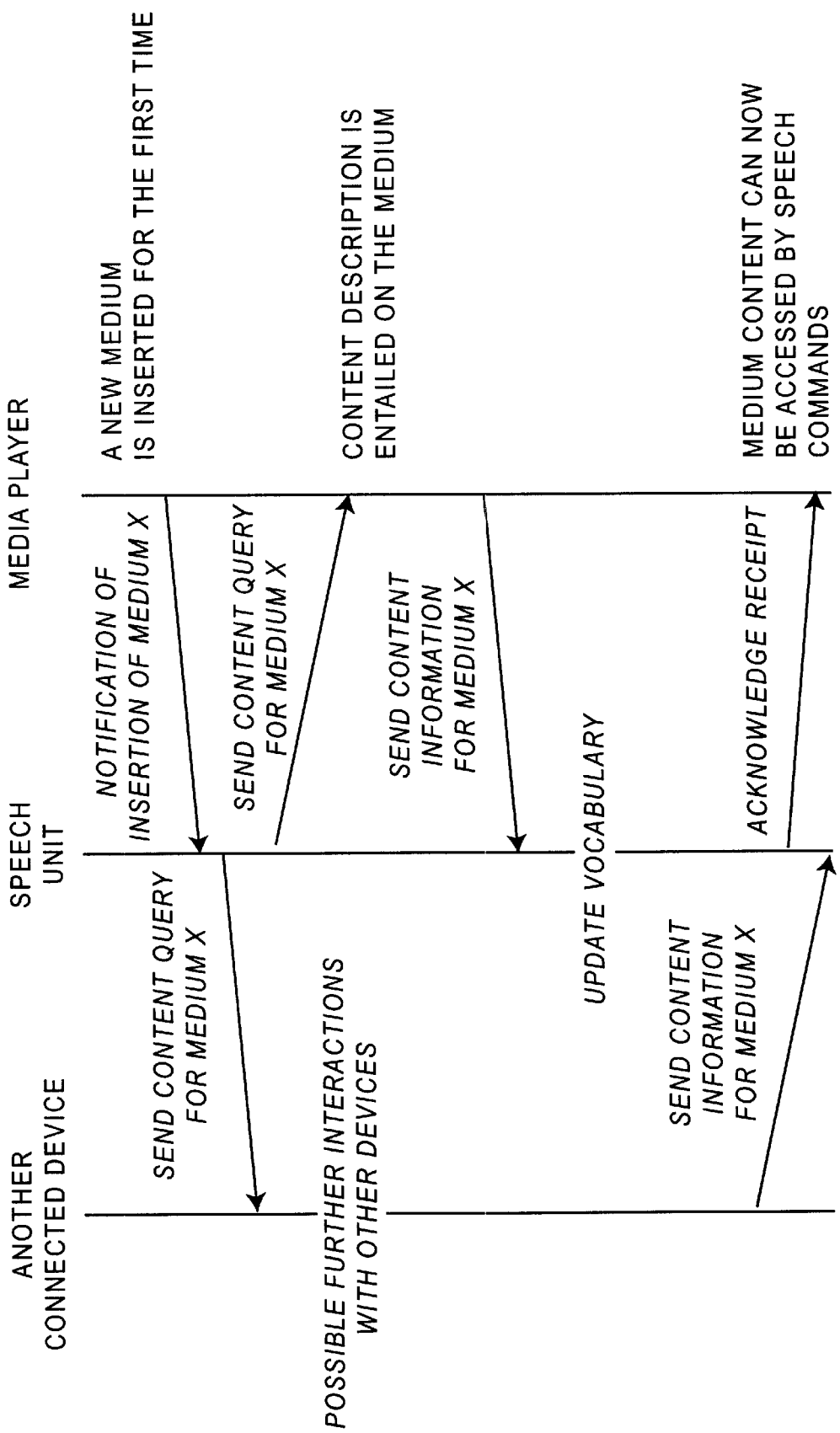

SPEECH RECOGNITION CONTROL OF REMOTELY CONTROLLABLE DEVICES IN A HOME NETWORK ENVIRONMENT

DESCRIPTION

This invention relates to a speech interface in a home network environment. In particular, it is concerned with a speech recognition device, a remotely controllable device and a method of self-initialization of a speech recognition device.

Generally, speech recognizers are known for controlling different consumer devices, i.e. television, radio, car navigation, mobile telephone, camcorder, PC, printer, heating of buildings or rooms. Each of these speech recognizers is built into a specific device to control it. The properties of such a recognizer, such as the vocabulary, the grammar and the corresponding commands, are designed for this particular task.

On the other hand, technology is now available to connect different of the above listed consumer devices via a home network with dedicated bus systems, e.g. a IEEE 1394 bus. Devices adapted for such systems communicate by sending commands and data to each other. Usually such devices identify themselves when they are connected to the network and get a unique address assigned by a network controller. Thereafter, these addresses can be used by all devices to communicate with each other. All other devices already connected to such a network are informed about address and type of a newly connected device. Such a network will be included in private homes as well as cars.

Speech recognition devices enhance comfort and, if used in a car may improve security, as the operation of consumer devices becomes more and more complicated, e.g. controlling of a car stereo. Also in a home network environment e.g. the programming of a video recorder or the selection of television channels can be simplified when using a speech recognizer. On the other hand, speech recognition devices have a rather complicated structure and need a quite expensive technology when a reliable and flexible operation should be secured, therefore, a speech recognizer will not be affordable for most of the devices listed above.

Therefore, it is the object of the present invention to provide a generic speech recognizer facilitating the control of several devices. Further, it is the object of the present invention to provide a remotely controllable device that simplifies its network-controllability via speech.

A further object is to provide a method of self-initialization of the task dependent parts of such a speech recognition device to control such remotely controllable devices.

These objects are respectively achieved as defined in the independent claims 1, 4, 14, 15 and 18.

Further preferred embodiments of the invention are defined in the respective subclaims.

The present invention will become apparent and its numerous modifications and advantages will be better understood from the following detailed description of an embodiment of the invention taken in conjunction with the accompanying drawings, wherein FIG. 1 shows a block diagram of an example of a speech unit according to an embodiment of the invention;

Figure 8:
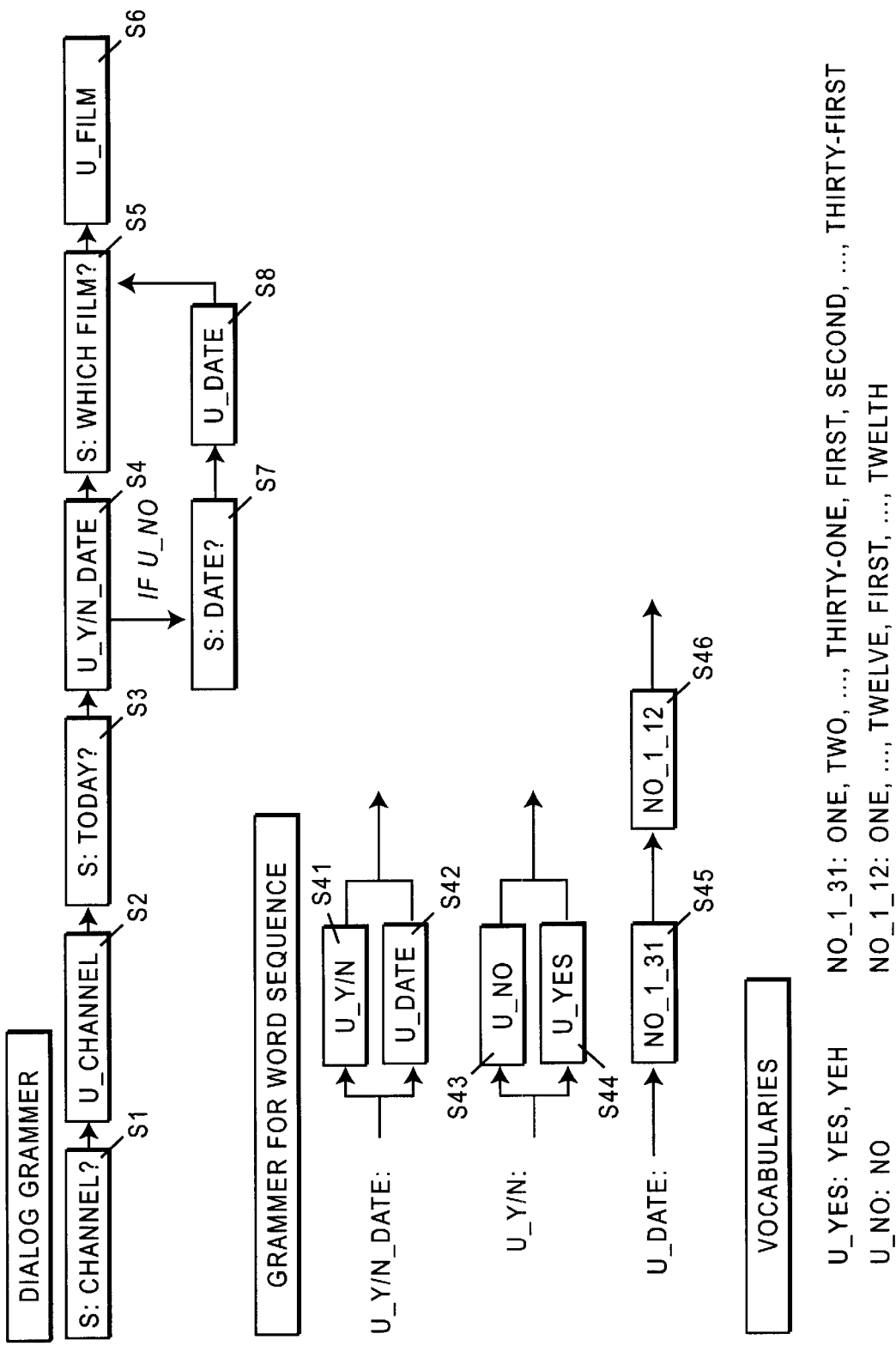
Figure 9:
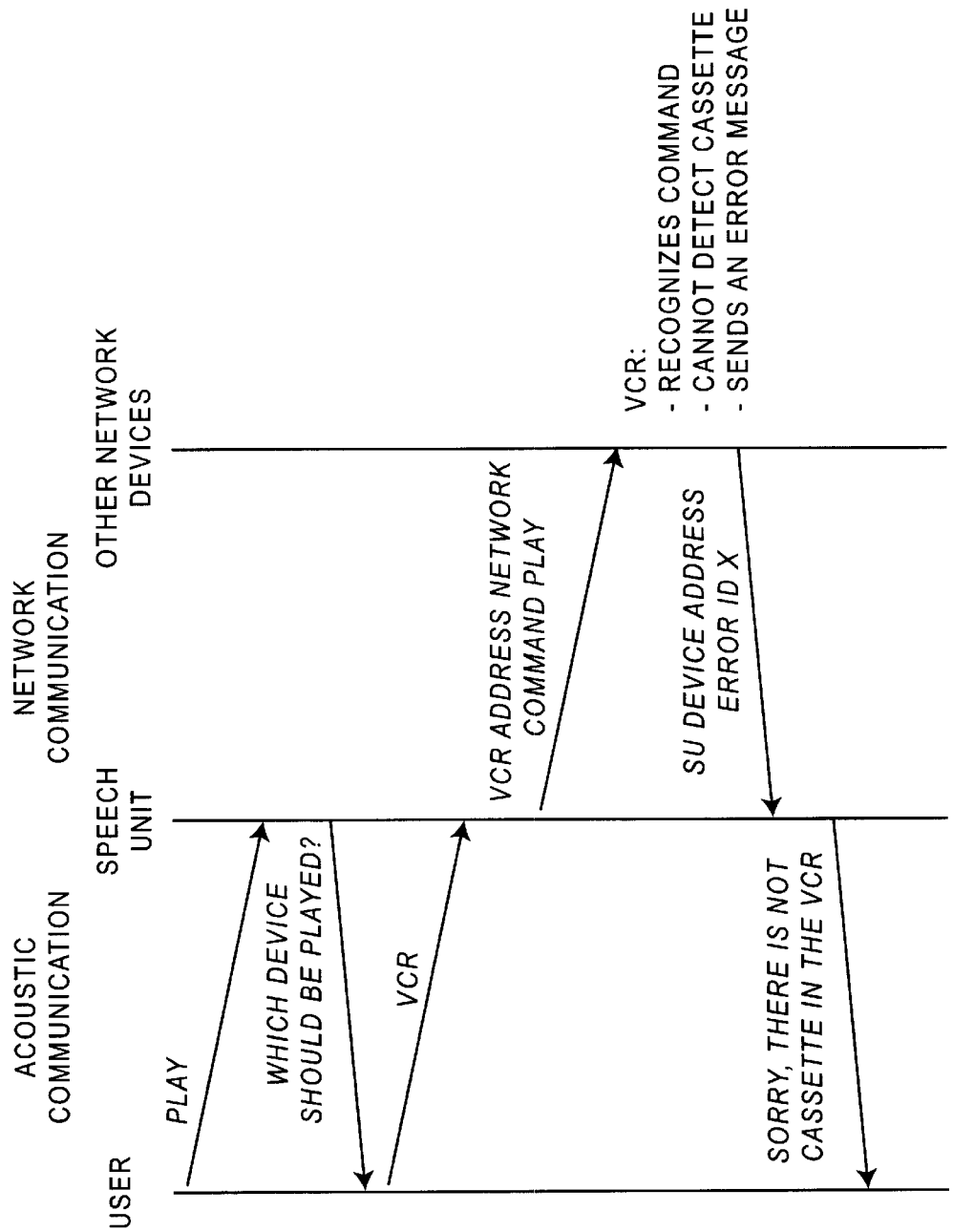
Figure 10:
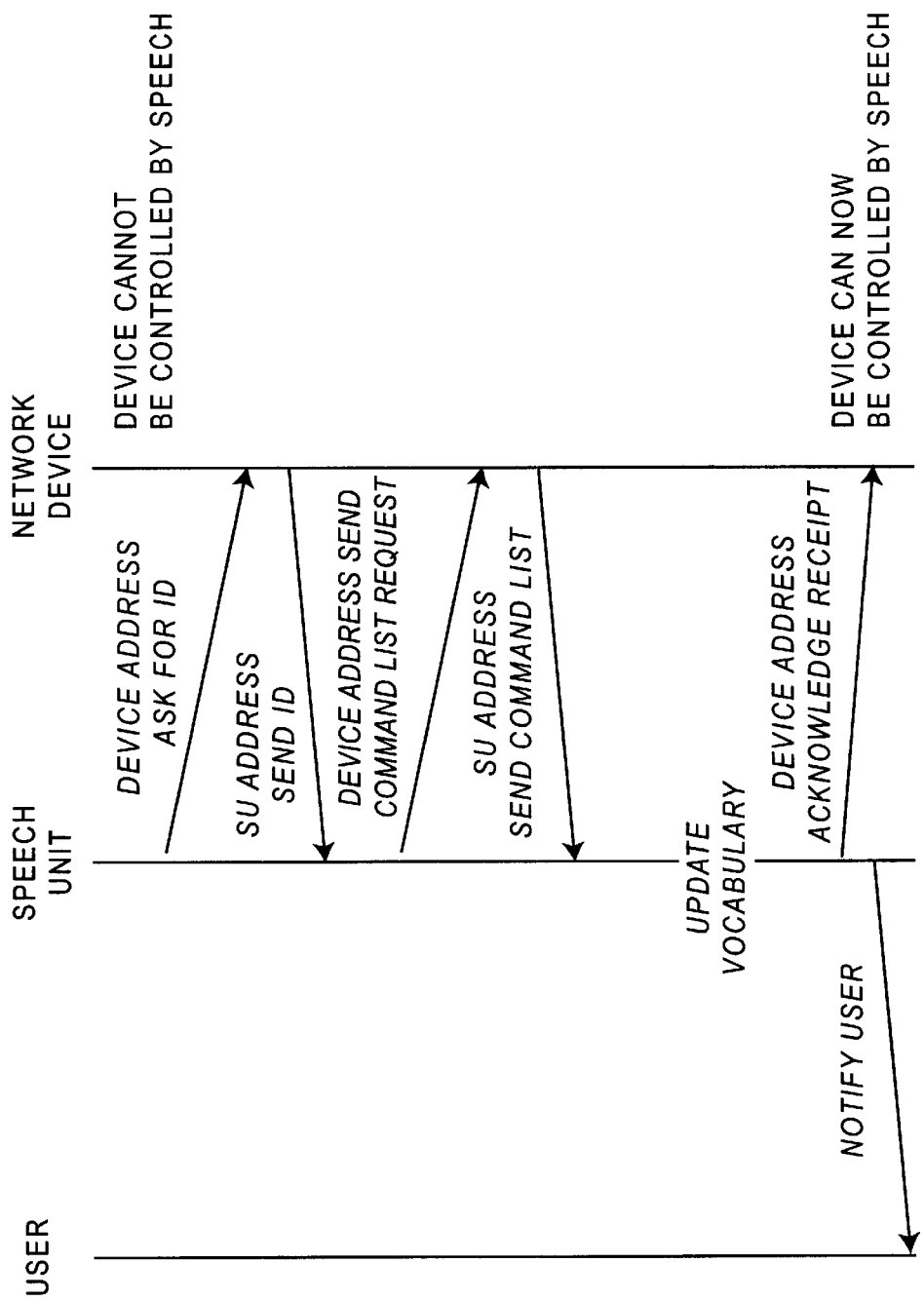
Figure 11:
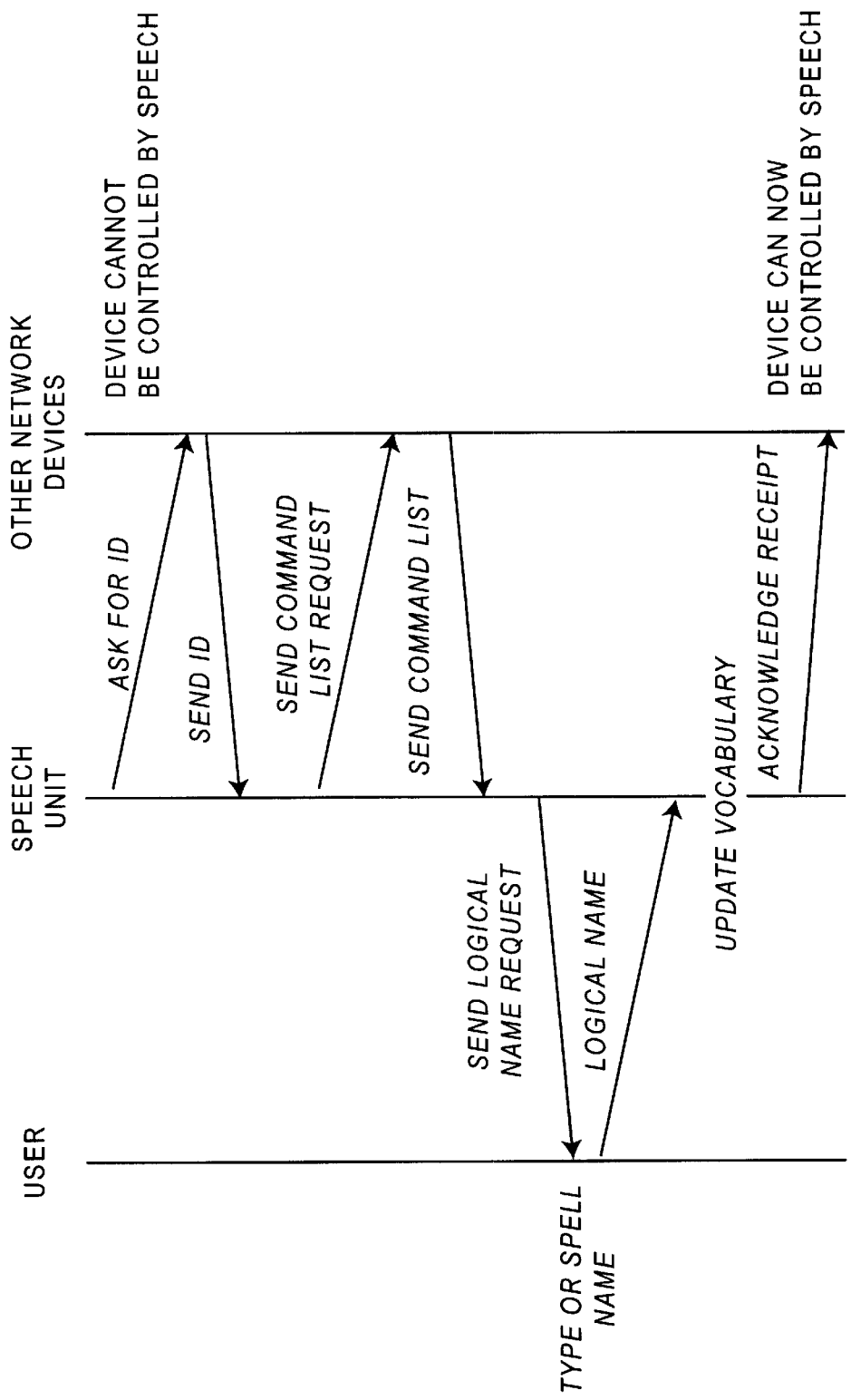
Figure 12:
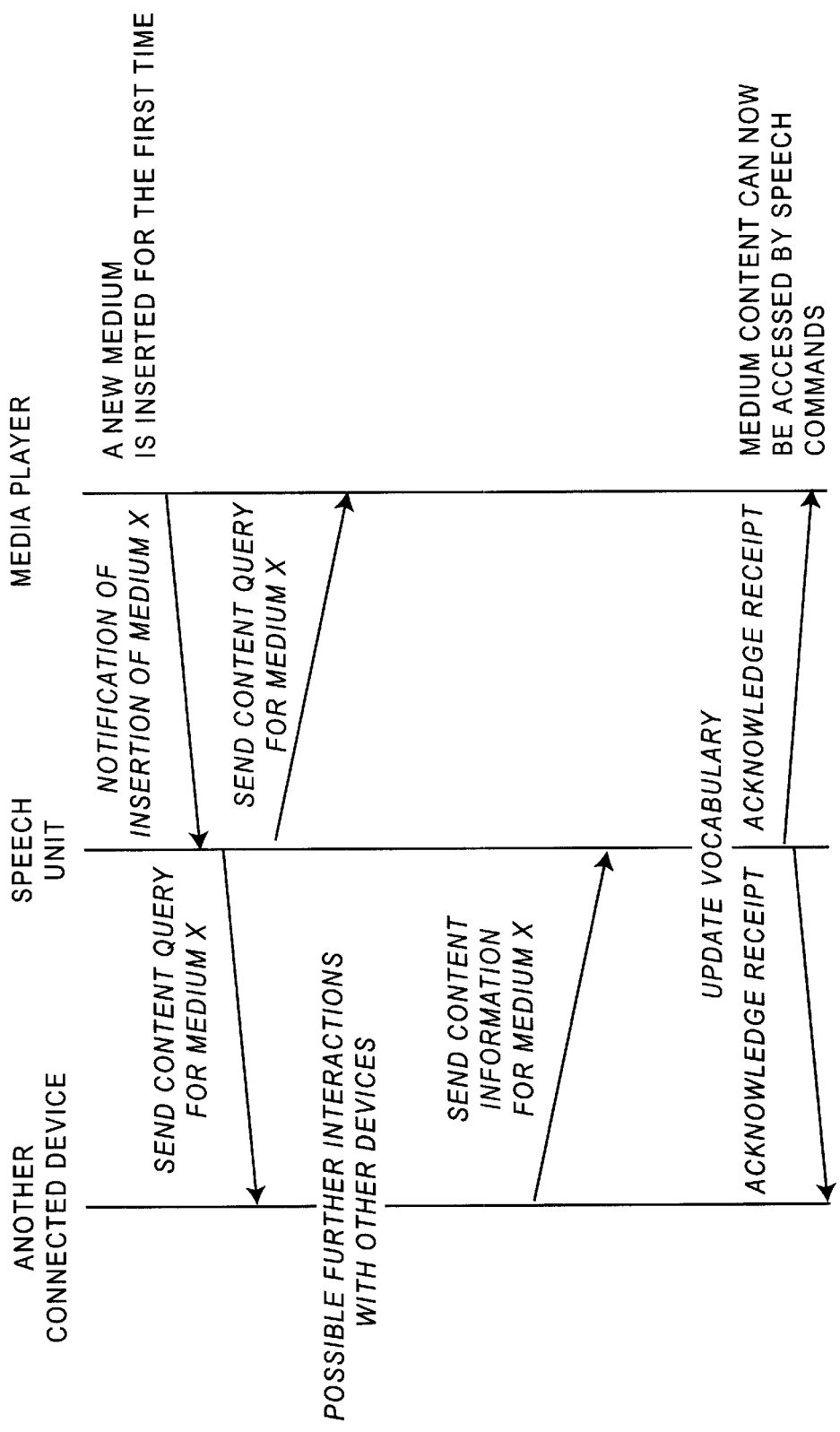

FIGS. 7(*a*) and 7(*b*) show two examples of controlling a network device remotely via a speech recognizer;

FIG. 8 shows an example of a part of a grammar for a user dialogue during a VCR programming;

FIG. 9 shows an example of a protocol of the interaction between a user, a speech recognizer and a network device;

FIG. 10 shows an example of a learning procedure of a connected device, where the name of the device is determined automatically;

FIG. 11 shows an example of a protocol of a notification procedure of a device being newly connected, where the user is asked for the name of the device;

FIG. 12 shows an example of a protocol of the interaction of multiple devices for vocabulary extensions concerning media contents; and FIG. 13 shows another example of a protocol of the interaction of multiple devices for vocabulary extensions concerning media contents.

Figure 1:
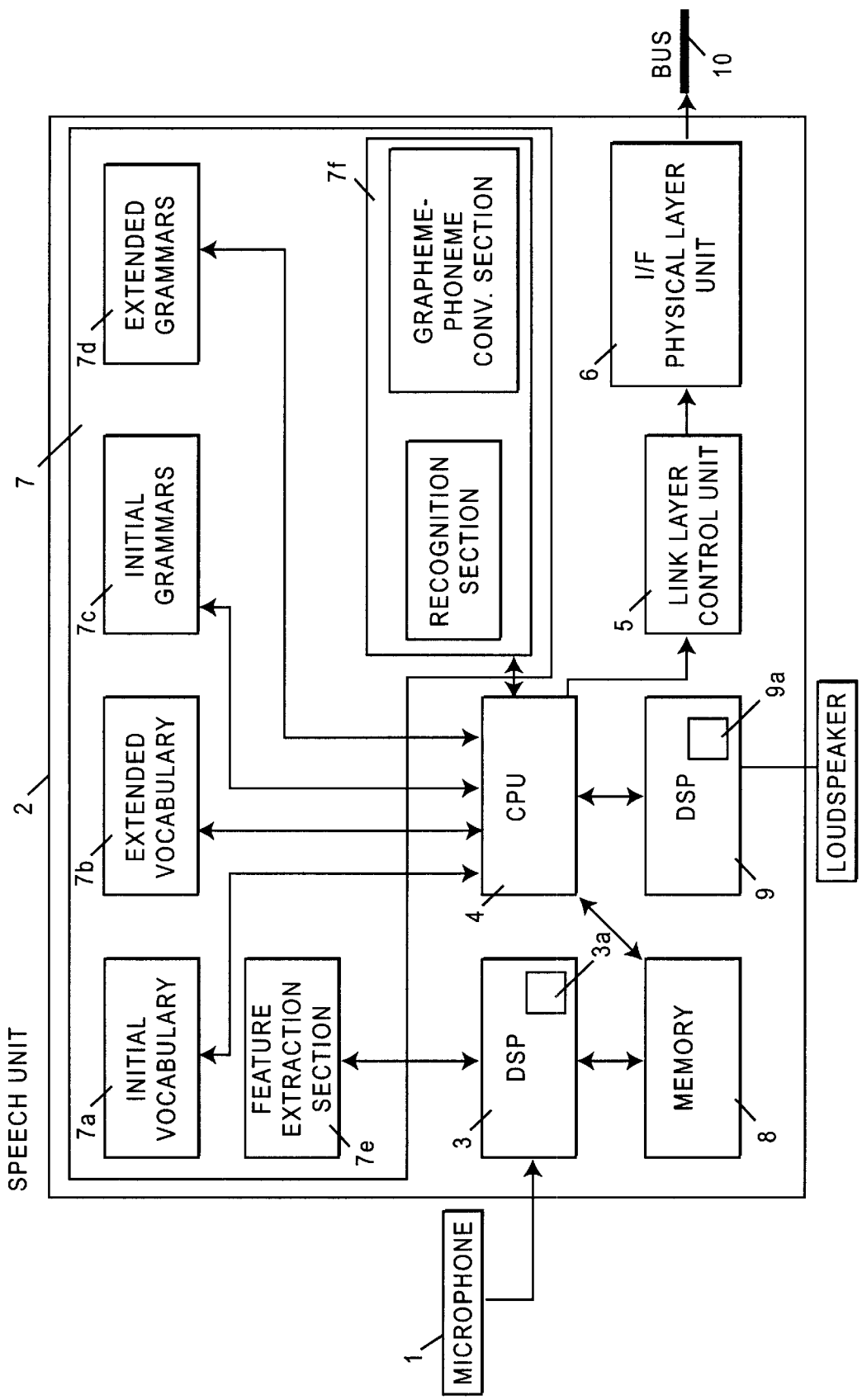

FIG. 1 shows a block diagram of an example of the structure of a speech unit 2 according to the invention. Said speech unit 2 is connected to a microphone 1 and a loudspeaker, which could also be built into said speech unit 2. The speech unit 2 comprises a speech synthesizer, a dialogue module, a speech recognizer and a speech interpreter and is connected to an IEEE 1394 bus system 10. It is also possible that the microphone 1 and/or the loudspeaker are connected to the speech unit 2 via said bus system 10. Of course it is then necessary that the microphone 1 and/or the loudspeaker are respectively equipped with a circuitry to communicate with said speech unit 2 via said network, such as A/D and D/A converters and/or command interpreters, so that the microphone 1 can transmit the electric signals corresponding to received spoken utterances to the speech unit 2 and the loudspeaker can output received electric signals from the speech unit 2 as sound.

IEEE 1394 is an international standard, low-cost digital interface that will integrate entertainment, communication and computing electronics into consumer multimedia. It is a low-cost easy-to-use bus system, since it allows the user to remove or add any kind of 1394 devices with the bus being active. Although the present invention is described in connection with such an. IEEE 1394 bus system and IEEE 1394 network devices, the proposed technology is independent from the specific IEEE 1394 standard and is well-suited for all kinds of wired or wireless home networks or other networks.

As will be shown in detail later, a speech unit 2, as shown in FIG. 1 is connected to the home network 10. This is a general purpose speech recognizer and synthesizer having a generic vocabulary. The same speech unit 2 is used for controlling all of the devices 11 connected to the network 10. The speech unit 2 picks up a spoken-command from a user via the microphone 1, recognizes it and converts it into a corresponding home network control code, henceforth called user-network-command, e.g. specified by the IEEE 1394 standard. This control code is then sent to the appropriate device that performs the action associated with the user-network-command.

To be capable of enabling all connected network devices to be controlled by speech, the speech unit has to "know" the commands that are needed to provide operability of all individual devices 11. Initially, the speech unit "knows" a basic set of commands, e.g., commands that are the same for various devices. There can be a many-to-one mapping between spoken-commands from a user and user-network-commands generated therefrom. Such spoken-commands can e.g. be play, search for radio station YXZ or (sequences of) numbers such as phone numbers. These commands can be spoken in isolation or they can be explicitly or implicitly embedded within full sentences. Full sentences will henceforth as well be called spoken-command.

In general, speech recognizers and technologies for speech recognition, interpretation, and dialogues are well-known and will not be explained in detail in connection with this invention. Basically, a speech recognizer comprises a set of vocabulary and a set of knowledge-bases (henceforth grammars) according to which a spoken-command from a user is converted into a user-network-command that can be carried out by a device. The speech recognizer also may use a set of alternative pronunciations associated with each vocabulary word. The dialogue with the user will be conducted according to some dialogue model.

The speech unit 2 according to an embodiment of the invention comprises a digital signal processor 3 connected to the microphone 1. The digital signal processor 3 receives the electric signals corresponding to the spoken-command from the microphone 1 and performs a first processing to convert these electric signals into digital words recognizable by a central processing unit 4. To be able to perform this first processing, the digital signal processor 3 is bidirectionally coupled to a memory 8 holding information about the process to be carried out by the digital signal processor 3 and a speech recognition section 3a included therein. Further, the digital signal processor 3 is connected to a feature extraction section 7e of a memory 7 wherein information is stored of how to convert electric signals corresponding to spoken-commands into digital words corresponding thereto. In other words, the digital signal processor 3 converts the spoken-command from a user input via the microphone 1 into a computer recognizable form, e.g. text code.

The digital signal processor 3 sends the generated digital words to the central processing unit 4. The central processing unit 4 converts these digital words into user-network-commands sent to the home network system 10. Therefore, the digital signal processor 3 and the central processing unit 4 can be seen as speech recognizer, dialogue module and speech interpreter.

It is also possible that the digital signal processor 3 only performs a spectrum analysis of the spoken-command from a user input via the microphone 1 and the word recognition itself is conducted in the central processing unit 4 together with the convertion into user-network-commands. Depending on the capacity of the central processing unit 4, it can also perform the spectrum analysis and the digital signal processor 3 can be omitted.

Further, the central processing unit 4 provides a learning function for the speech unit 2 so that the speech unit 2 can learn new vocabulary, grammar and user-network-commands to be sent to a network device 11 corresponding thereto. To be able to perform these tasks the central processing unit 4 is bidirectionally coupled to the memory 8 that is also holding information about the processes to be performed by the central processing unit 4. Further, the central processing unit 4 is bidirectionally coupled to an initial vocabulary section 7a, an extended vocabulary section 7b, an initial grammar section 7c, an extended grammar section 7d and a software section 7f that comprises a recognition section and a grapheme-phoneme conversion section of the memory 7. Further, the central processing unit 4 is bidirectionally coupled to the home network system 10 and can also send messages to a digital signal processor 9 included in the speech unit 2 comprising a speech generation section 9a that serves to synthesize messages into speech and outputs this speech to a loudspeaker.

The central processing unit 4 is bidirectionally coupled to the home network 10 via a link layer control unit 5 and an interface (I/F) physical layer unit 6. These units serve to filter out network-commands from bus 10 directed to the speech unit 2 and to address network-commands to selected devices connected to the network 10.

Therefore, it is also possible that new user-network-commands together with corresponding vocabulary and grammars can be learned by the speech unit 2 directly from other network devices. To perform such a learning, the speech unit 2 can send control commands stored in the memory 8 to control the network devices, henceforth called control-network-commands, to request their user-network-commands and corresponding vocabulary and grammars according to which they can be controlled by a user. The memory 7 comprises an extended vocabulary section 7b and an extended grammar section 7d to store newly input vocabulary or grammars. These sections are respectively designed like the initial vocabulary section 7a and the initial grammar section 7c, but newly input user-network-commands together with information needed to identify these user-network-commands can be stored in the extended vocabulary section 7b and the extended grammar section 7d by the central processing unit 4. In this way, the speech unit 2 can learn user-network-commands and corresponding vocabulary and grammars built into an arbitrary network device. New network devices have then no need to have a built-in speech recognition device, but only the user-network-commands and corresponding vocabulary and grammars that should be controllable via a speech recognition system. Further, there has to be a facility to transfer these data to the speech unit 2. The speech unit 2 according to the invention learns said user-network-commands and corresponding vocabulary and grammar and the respective device can be voice-controlled via the speech unit 2.

The initial vocabulary section 7a and the initial grammar section 7c store a basic set of user-network-commands that can be used for various devices, like user-network-commands corresponding to the spoken-commands switch on, switch off, pause, louder, etc., these user-network-commands are stored in connection with vocabulary and grammars needed by the central processing unit 4 to identify them out of the digital words produced by the speech recognition section via the digital signal processor 3. Further, questions or messages are stored in a memory. These can be output from the speech unit 2 to a user. Such questions or messages may be used in a dialogue in-between the speech unit 2 and the user to complete commands spoken by the user into proper user-network-commands, examples are please repeat, which device, do you really want to switch off?, etc. All such messages or questions are stored together with speech data needed by the central processing unit 4 to generate digital words to be output to the speech generation and synthesis section 9a of the digital signal processor 9 to generate spoken utterances output to the user via the loud-speaker. Through the microphone 1, the digital signal processors 3 and 9 and the loud-speaker a "bidirectional coupling" of the central processing unit 4 with a user is possible. Therefore, it is possible that the speech unit 2 can communicate with a user and learn from him or her. Like in the case of the communication with a network device 11, the speech unit 2 can access a set of control-network-commands stored in the memory 8 to instruct the user to give certain information to the speech unit 2.

As stated above, also user-network-commands and the corresponding vocabulary and grammars can be input by a user via the microphone 1 and the digital signal processor 3 to the central processing unit 4 on demand of control-network-commands output as messages by the speech unit 2 to the user. After the user has uttered a spoken-command to set the speech unit 2 into learning state with him, the central processing unit 4 performs a dialogue with the user on the basis of control-network-commands stored in the memory 8 to generate new user-network-commands and corresponding vocabulary to be stored in the respective sections of the memory 7.

It is also possible that the process of learning new user-network-commands is done half-automatically by the communication in-between the speech unit 2 and an arbitrary network device and half-dialogue controlled between the speech unit 2 and a user. In this way, user-dependent user-network-commands for selected network devices can be generated.

As stated above, the speech unit 2 processes three kinds of commands, i.e. spoken-commands uttered by a user, user-network-commands, i.e. digital signals corresponding to the spoken-commands, and control-network-commands to perform a communication with other devices or with a user to learn new user-network-commands from other devices 11 and to assign certain functionalities thereto so that a user can input new spoken-commands or to assign a new functionality to user-network-commands already included.

Output of the speech unit directed to the user are either synthesized speech or pre-recorded utterances. A mixture of both might be useful, e.g. pre-recorded utterances for the most frequent messages and synthesized speech for other messages. Any network device can send messages to the speech unit. These messages are either directly in orthographic form or they encode or identify in some way an orthographic message. Then these orthographic messages are output via a loudspeaker, e.g. included in the speech unit 2. Messages can contain all kinds of information usually presented on a display of a consumer device. Furthermore, there can be questions put forward to the user in course of a dialogue. As stated above, such a dialogue can also be produced by the speech unit 2 itself to verify or confirm spoken-commands or it can be generated by the speech unit 2 according to control-network-commands to learn new user-network-commands and corresponding vocabulary and grammars.

The speech input and/or output facility, i.e. the microphone 1 and the loudspeaker, can also be one or more separate device(s). In this case messages can be communicated in orthographic form in-between the speech unit and the respective speech input and/or output facility.

Spoken messages sent from the speech unit 2 itself to the user, like which device should be switched on?, could also be asked back to the speech unit 2, e.g. which network device do you know?, and first this question could be answered by the speech unit 2 via speech, before the user answers the initial spoken message sent from the speech unit.

Figure 2:
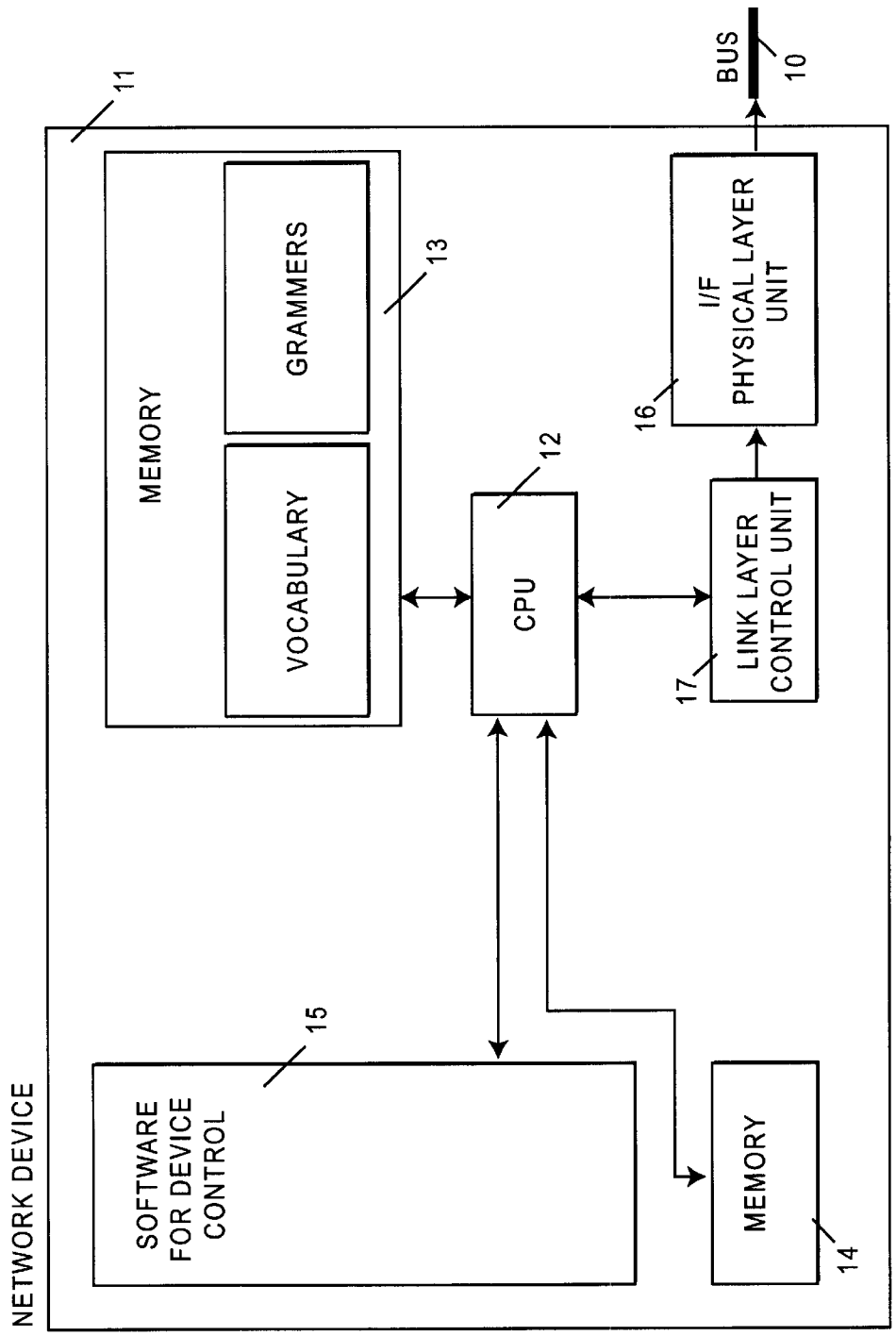
FIG. 2 shows a block diagram of an example of a network device according to an embodiment of the invention.

FIG. 2 shows a block diagram of an example of the structure of remotely controllable devices according to an embodiment of this invention, here a network device 11. This block diagram shows only those function blocks necessary for the speech controllability. A central processing unit 12 of such a network device 11 is connected via a link layer control unit 17 and an I/F physical layer unit 16 to the home network bus 10. Like in the speech unit 2, the connection in-between the central processing unit 12 and the home network bus 10 is bidirectional so that the central processing unit 12 can receive user-network-commands and control-network-commands and other information data from the bus 10 and send control-network-commands, messages and other information data to other network devices or a speech unit 2 via the bus 10. Depending on the device, it might also be possible that it will also send user-network-commands. The central processing unit 12 is bidirectionally coupled to a memory 14 where all information necessary for the processing of the central processing unit 12 including a list of control-network-commands needed to communicate with other network devices is stored. Further, the central processing unit 12 is bidirectionally coupled to a device control unit 15 controlling the overall processing of the network device 11. A memory 13 holding all user-network-commands to control the network device 11 and the corresponding vocabulary and grammars is also bidirectionally coupled to the central processing unit 12. These user-network-commands and corresponding vocabularies and grammars stored in the memory 13 can be down-loaded into the extended vocabulary section 7b and the extended grammar section 7d of the memory 7 included in the speech unit 2 in connection with a device name for a respective network device 11 via the central processing unit 12 of the network device 11, the link layer control unit 17 and the I/F physical layer unit 16 of the network device 11, the home network bus system 10, the I/F physical layer unit 6 and the link layer control unit 5 of the speech unit 2 and the central processing unit 4 of the speech unit 2. In this way all user-network-commands necessary to control a network device 11 and corresponding vocabulary and grammars are learned by the speech unit 2 according to the present invention and therefore, a network device according to the present invention needs no built-in device dependent speech recognizer to be controllable via speech, but just a memory holding all device dependent user-network-commands with associated vocabulary and grammars to be downloaded into the speech unit 2. It is to be understood that a basic control of a network device by the speech unit 2 is also given without vocabulary update information, i.e. the basic control of a network device without its device dependent user-network-commands with associated vocabulary and grammars is possible. Basic control means here to have the possibility to give commands generally defined in some standard, like switch-on, switch-off, louder, switch channel, play, stop, etc.

Figure 3:
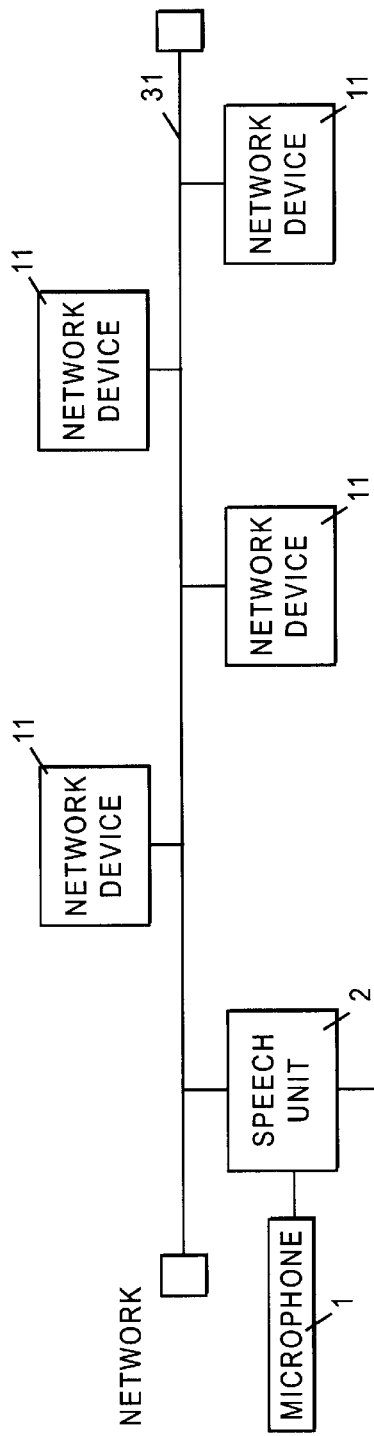
FIG. 3 shows an example of a wired 1394 network having a speech unit and several 1394 devices.

FIG. 3 shows an example of a network architecture having an IEEE 1394 bus and connected thereto one speech unit 2 with microphone 1 and loudspeaker and four network devices 11.

Figure 4:
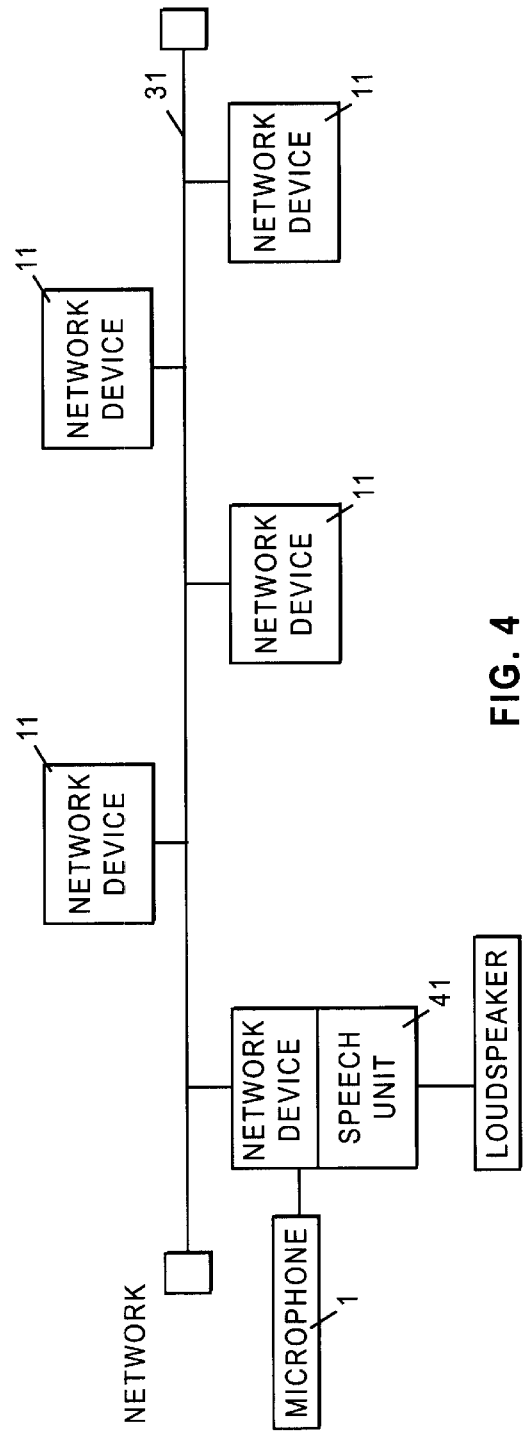
FIG. 4 shows an example of a wired 1394 network having a speech unit incorporated in a 1394 device and several normal 1394 devices.

FIG. 4 shows another example of a network architecture having four network devices 11 connected to an IEEE 1394 bus. Further, a network device 4 having a built-in speech unit with microphone 1 and loudspeaker is connected to the bus 31. Such a network device 41 with a built-in speech unit has the same functionality as a network device 11 and a speech unit 2. Here, the speech unit controls the network device 11 and the network device 41 which it is built-in.

Figure 5:
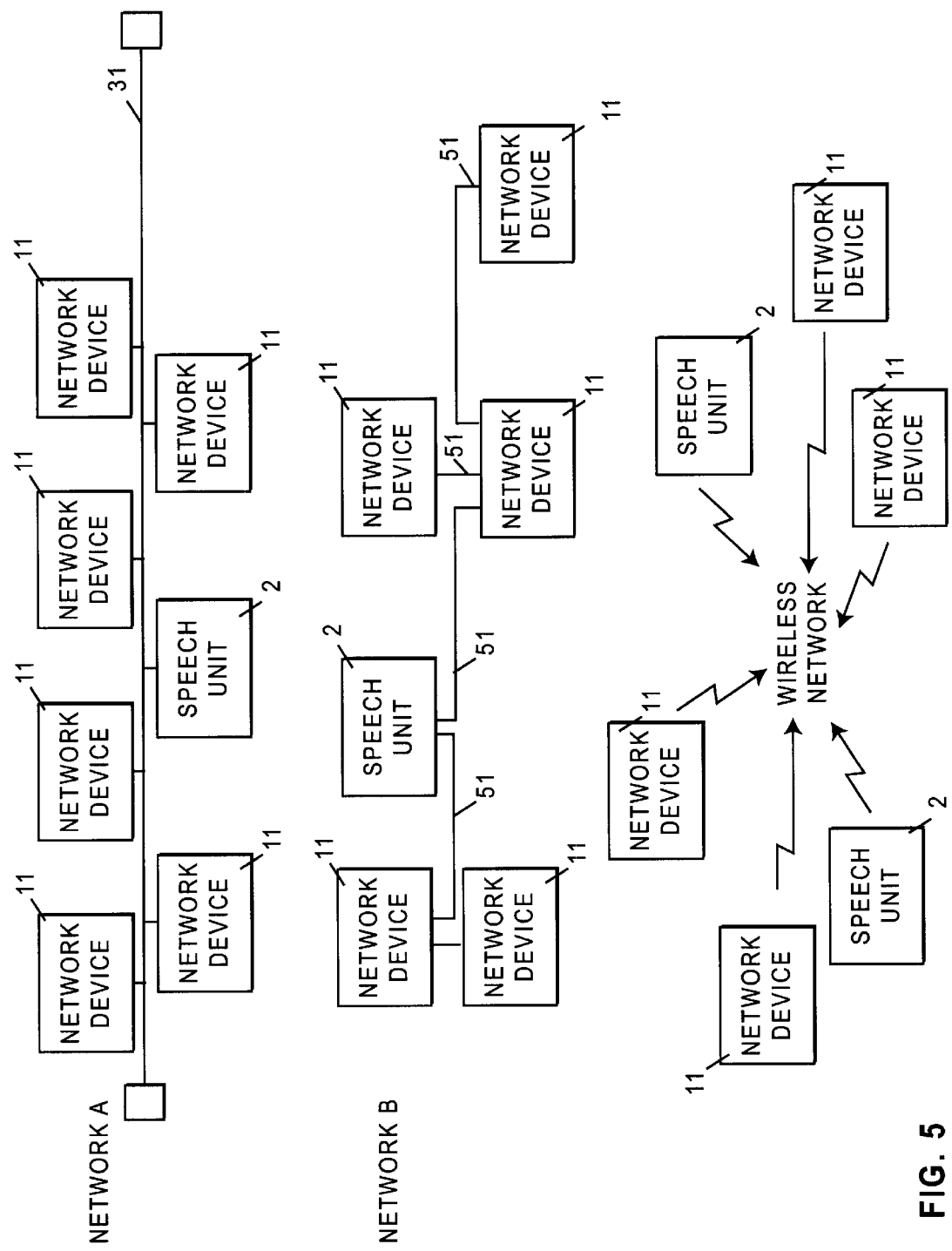
FIG. 5 shows three examples of different types of networks.

FIG. 5 shows further three examples for network architectures. Network A is a network similar to that shown in FIG. 3, but six network devices 11 are connected to the bus 31. In regard to the speech unit 2 that is also connected to the bus 31, there is no limitation of network devices 11 controllable via said speech unit 2. Every device connected to the bus 31 that is controllable via said bus 31 can also be controlled via the speech unit 2.

Network B shows a different type of network. Here, five network devices 11 and one speech unit 2 are connected to a bus system 51. The bus system 51 is organized so that a connection is only necessary in-between two devices. Network devices not directly connected to each other can communicate via other third network devices. Regarding the functionality, network B has no restrictions in comparison to network A.

The third network shown in FIG. 5 is a wireless network. Here, all devices can directly communicate with each other via a transmitter and a receiver built into each device. This example shows also that several speech units 2 can be connected to one network. Those speech units 2 can have both the same functionality or both different functionalities, as desired. In this way, it is also easily possible to build personalized speech units 2 that can be carried by respective users and that can control different network devices 11, as desired by the user. Of course, personalized speech units can also be used in a wired network. In comparison to a wireless speech input and/or output facility a personalized speech unit has the advantage that it can automatically log-into another network and all personalized features are available.

Such a personalized network device can be constructed to translate only those spoken-commands of a selected user into user-network-commands using speaker-adaption or speaker-verification. This enables a very secure access policy in that an access is only allowed if the correct speaker uses the correct speech unit. Of course, all kinds of accesses can be controlled in this way, e.g. access to the network itself, access to devices connected to the network, like access to rooms, to a VCR, to televisions and the like.

Further, electronic phone books my be stored within the speech unit. Calling functions by name, e.g. office, is strongly user-dependent and therefore such features will be preferably realized in personalized speech units. Also spoken-commands as switch on my TV can easily be assigned to the correct user-network-commands controlling the correct device, as it may be the case that different users assign different logical names therefore and the speech unit 2 has to generate the same user-network-command when interpreting different spoken-commands. On the other hand, it is possible that the network e.g. comprises more than one device of the same type, e.g. two TVs, and the speech unit 2 has to generate different user-network-commands when interpreting the same spoken-command uttered by different users, e.g. switch on my TV.

One speech unit can contain personalized information of one user or different users. In most cases the personalized speech unit corresponding to only one user will be portable and wireless, so that the user can take it with him/her and has the same speech unit at home, in the car or even other networks, like in his/her office.

The personalized speech unit can be used for speaker verification purposes. It verifies the words of a speaker and allows the control of selected devices. This can also be used for controlling access to rooms, cars or devices, such as phones.

A personalized speech unit can contain a speech recognizer adapted to one person which strongly enhances the recognition performance.

Figure 6:
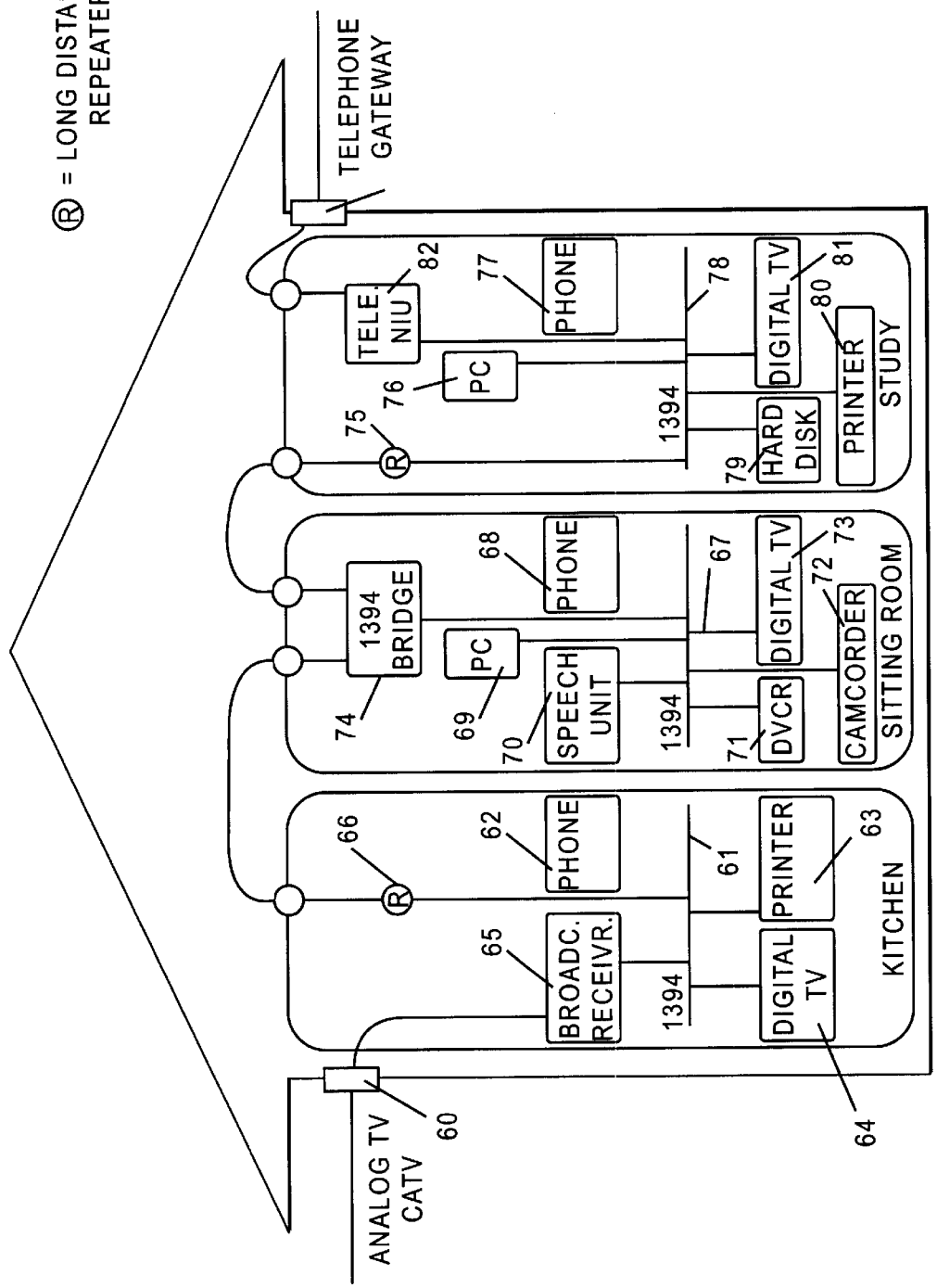
FIG. 6 shows an example of a home network in a house having three clusters.

FIG. 6 shows an example of a home network consisting of three clusters. One of the clusters is built by an IEEE 1394 bus 61 installed in a kitchen of the house. Connected to this bus is a broadcast receiver 65, a digital television 64, a printer 63, a phone 62 and a long distance repeater 66. This cluster has also connections to a broadcast gateway 60 to the outside of the house and via the repeater 66 and an IEEE 1394 bridge 74 to the cluster "sitting room" in which also an IEEE 1394 bus 67 is present. Apart from the bridge 74, a speech unit 70, a personal computer 69, a phone 68, a VCR 71, a camcorder 72 and a digital television 73a is connected to the bus 67. The bridge 74 is also connected to the third cluster "study" which comprises an IEEE 1394 bus 78 connected to the bridge 74 via a long distance repeater 75. Further, a personal computer 76, a phone 77, a hard disc 79, a printer 80, a digital television 81 and a telephone NIU 82 are connected to said bus 78. A telephone gateway 83 is connected to the telephone NIU 82.

The above described network is constructed so that every device can communicate with the other devices via the IEEE 1394 system, the bridge 74 and the repeaters 66 and 75. The speech unit 70 located in the sitting room can communicate with all devices and therewith have the possibility to control them. This speech unit 70 is built like the speech unit 2 described above. Since in the example shown in FIG. 6 several devices of the same type are present, e.g., the digital television 30 in the sitting room and the digital television 81 in the study, it is possible to define user defined device names. When the network is set-up or when a device is connected to the network having already a device of this type connected thereto, the speech unit 70 will ask the user for names for these devices, e.g. television in the sitting room and television in the study to be assigned to the individual devices. To be able to recognize these names, one of the following procedures has to be done.

1. The user has to enter the orthographic form (sequence of letters) of the device name by typing or spelling. The speech unit 70 maps the orthographic form into phoneme or model sequence;
2. In the case of a personalized speech unit, the user utterance corresponding to the device name can be stored as a feature vector sequence, that is directly used during recognition as reference pattern in a pattern matching approach;
3. The phoneme sequence corresponding to the name can be learned automatically using a phoneme recognizer.

The user has then only to address these devices by name, e.g. television in the sitting room. The speech unit 70 maps the name to the appropriate network address. By default, the name corresponds to the functionality of the device. All commands uttered by a user are sent to the device named at last. Of course it is also possible that these names are changed later on.

In many situations a person might wish to access his device at home over the phone, e.g. to retrieve faxes or to control the heating remotely. Two alternative architectures to realize such a remote access are illustrated in FIG. 7.

Figure 7A:
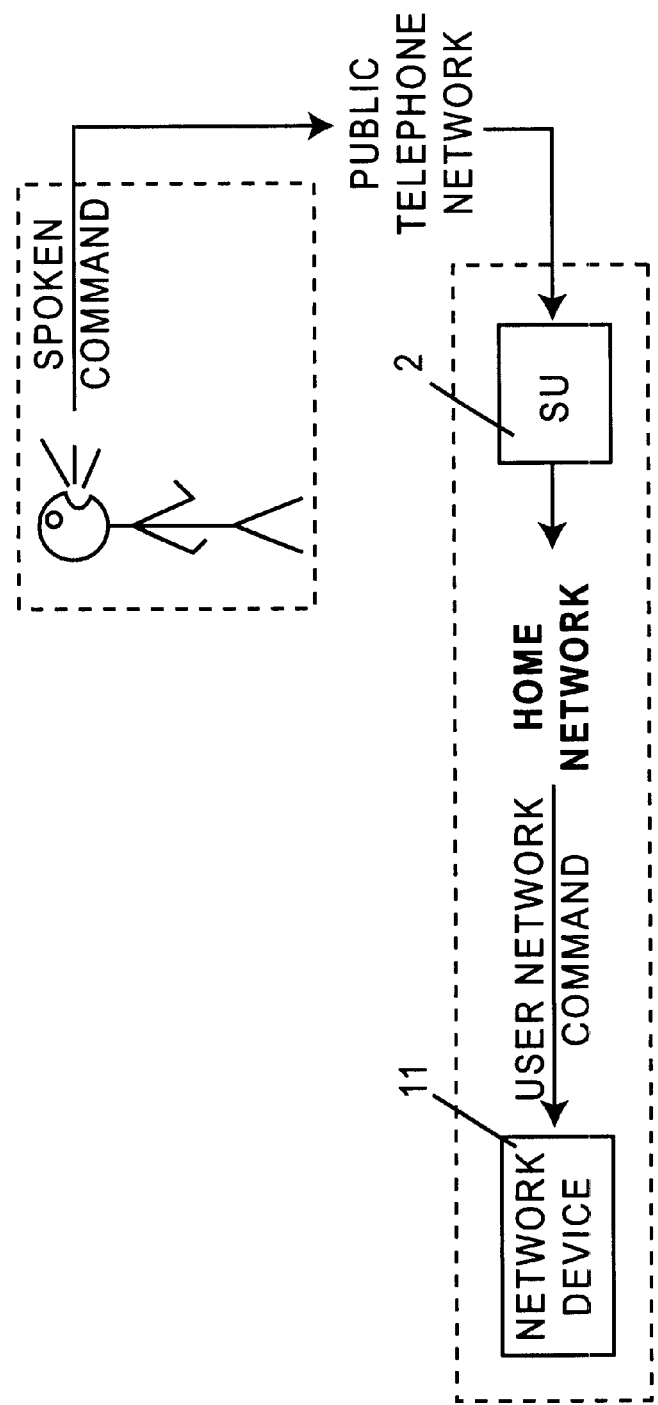

FIG. 7a shows that a speech unit 2 is connected to the home network having a network device 11 and to the public telephone network. A spoken-command from a user is transmitted via the public telephone network to the speech unit 2 that translates the spoken-command into a user-network-command to control the network device 11. A user can control his home network independently from any other devices but the speech unit 2 from any place he likes when he has an access to the public telephone network.

Figure 7B:
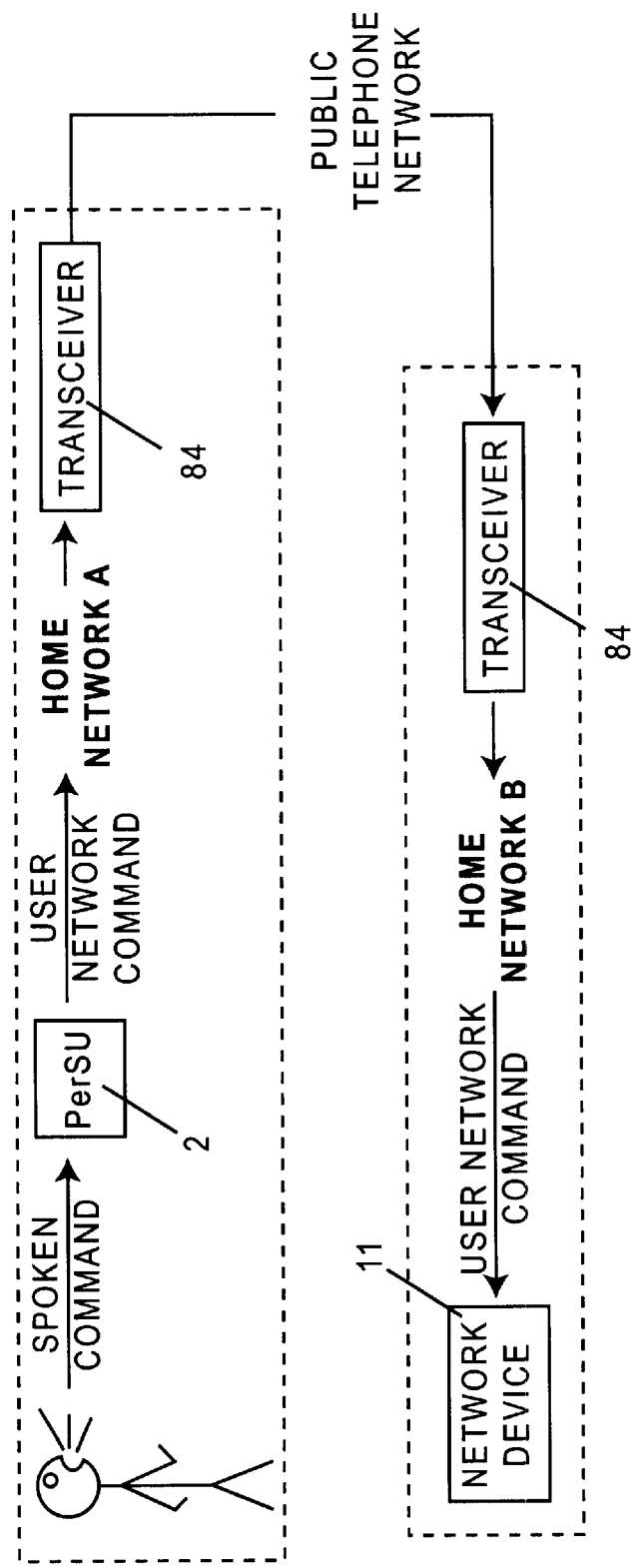

FIG. 7b shows another example in which a user having a personalized speech unit 2 is within the reception area of an arbitrary home network A. He utters a spoken-command into his personalized speech unit 2 that translates said spoken-command into a user-network-command and sends it to the home network A. The home network A sends the generated user-network-command via the transceivers 84 and the public telephone network to a home network B in which the network device 11 is located that gets controlled by the translated spoken-command uttered by the user. Of course, these features strongly depend on the available networks.

As described above, the speech unit 2 has a speech output facility either included or connected thereto directly or via a network so that messages from network devices can be synthesized into uttered sequences and a dialogue in-between the speech unit 2 and the user can be performed. Such a dialogue would for example also be useful for the programming of a VCR. The messages can also provide additional information about the status of the network device, e.g. the titles of the CDs contained in a juke box. In general, the number and type of message is not fixed.

FIG. 8 shows examples for a part of a grammar for a user dialogue during VCR programming. "S" are system questions; "U" denotes spoken-commands or other user utterances. Possible spoken-commands or user utterances at each dialogue step are defined by the word grammar and the vocabularies. Grammars, e.g. finite state transition grammars, are used to restrict the set of word sequences to be recognized or to specify a sequence of dialogue steps, e.g. needed to program a video recorder. A different finite state grammar may be specified to each dialogue step. These grammars are directly used by the speech unit. On the other hand, these grammars are entirely device-dependent. Therefore, it is not practical to have static finite state grammars in the speech unit. It is rather proposed that a device newly connected to the network can send its specific set of grammars to the speech unit.

As it is shown in the above part of FIG. 8, a dialogue grammar could be that in a step S1 the system asks the user for a channel, i.e. outputs a message channel? to the user. In a following step S2 the user inputs a word sequence U__CHANNEL to the system as spoken-command. Thereafter, in step S3 the system asks if the action to be programmed should be taken today. In the following step S4 the user inputs a word sequence U__Y/N__DATE to the system, telling yes, no or the date at which the action to be programmed should take place. If the date corresponds to today or the user answers the question of the system with yes, the system asks in a following step S5 which movie. Thereafter, in a step S6 the user informs the system about the film with a word sequence U__FILM. If the user has answered no in step S4, the system asks for the date in step S7. In the following step S8 the user inputs the date to the system as spoken-command in a word sequence U__DATE, thereafter the process flow continues with step S5. In the middle of FIG. 8 examples of the grammar for word sequences corresponding to the above example are shown. In step S4 the user can input yes, no or a date as a word sequence U__Y_N__DATE. Therefore, as it is shown in the first line for the word sequence U__Y/N__DATE, the user has the possibility to input a word sequence U__Y/N in a step S41 or a word sequence U__DATE in a step S42. In the second line for the word sequence U__Y/N the two possibilities for the user input are shown, namely the word sequence U__NO in a step S43 or the word sequence U__YES in a step S44. The third line for the word sequence U__DATE shows the possible word sequences for user inputs for a date, here a sequence of two numbers is allowed as input, a first number corresponding to a word sequence NO__1__31 in a step S45 and a second number corresponding to a word sequence NO__1-12 in a step S46.

The lower part of FIG. 8 shows vocabularies corresponding to these word sequences. For example, the word sequence U__YES can be represented by the words yes or yeh, the word sequence U__NO can be represented by the vocabulary no, the word sequence NO__1__31 can be represented by the vocabularies one, two, . . . thirty-one, first, second, . . . , thirty-first and the word sequence NO__1__12 can be represented by the vocabularies one, . . . twelve, first, . . . twelfth.

FIG. 9 shows an example or the interaction between a user, a speech unit and a network device.

First, the user utters the spoken-command play. In the shown case, the speech unit knows that more than one device connected to the network can be played. It determines that the spoken-command play does not comprise enough information to control a specific network device. Therefore, it outputs the message which device should be played? to the user. The answer to this message of the user to the speech unit is VCR. Now the speech unit determines that the user did provide enough information to control a specific network device as desired, here to set the VCR into the play state. Therefore, it transmits the corresponding user-network-command PLAY to the VCR address via the network. The VCR receives this user-network-command and tries to perform the associated action. In the shown case the VCR cannot detect a cassette, therefore it cannot be set into the play state and sends an error message to the device from which the user-network-command PLAY was received. In this case, an error ID X is sent to the device address of the speech unit. The speech unit receives this error message, recognizes it and outputs a corresponding message sorry, there is no cassette in the VCR to the user.

The speech unit acts as an interface in-between the network, including all network devices connected thereto, and one or more users. The users just have to utter spoken-commands to the speech unit connected to the network when they are within the reception area thereof and the speech unit that basically knows the state of the network or can generate it, verifies if complete user-network-commands can be generated or otherwise sends a message to the user precisely asking for a missing part of a message or spoken-command to be able to properly generate the corresponding user-network-command.

The speech unit has to keep track of devices connected to the network to eventually retrieve and understand new functionalities. Therefore the speech unit will check all connected devices for new speech control functionality. An exemplary process flow is shown in FIG. 10. It also has to keep track if devices are disconnected from the network.

First, the speech unit sends a request for the ID, including name and device type, to the device address of a network device connected to the network. In this state, the network device cannot be controlled by speech. After the device has received the request for its ID from the speech unit, it sends its ID to the address of the speech unit. Thereafter, the speech unit sends a request for the user-network-command list of the device to the corresponding device address. Having received this request, the network device sends its user-network-command list to the speech unit, the speech unit receives the user-network-command list, updates its vocabulary with the vocabulary and grammars received from the device and sends an acknowledgement receipt to the device address of the device. The device can now be controlled by speech. Preferably the speech unit notifies the user that a new device providing new speech control functionality is available after such a procedure.

If a new device is connected to the network it is possible that it broadcasts its ID, comprising network address, name and device type. FIG. 11 shows an example of such an initialization. Here it is shown that the device offering the new speech control functionality gives some kind of notification to the speech unit, then after sending the user-network-command list request and receiving the user-network-command list the speech unit asks a user to give a logical name for the newly connected device. The user then types or spells the name of the newly connected device so that the speech unit can receive it. Of course, it is also possible that the user just utters the new name. The logical name given by the user is received by the speech unit that updates the vocabulary and grammars and sends a confirmation of reception to the IEEE 1394 device that has been newly connected to the network. This device can now be controlled by speech.

The command list sent from the device to the speech unit can either exist of only the orthographic form of the spoken-commands in conjunction with the appropriate user-network-command or it additionally provides the pronunciation, e.g. phonemic transcriptions, for these spoken-commands. The speech units present vocabulary is then extended with these new user-network-commands. In case the user-network-command list only gave the orthography of the spoken-commands but not the transcriptions, a built-in grapheme-to-phoneme conversion section 7f generates the pronunciations and their variations and thus completes the user-network-command list. After updating the vocabulary and grammars the new device can be fully controlled by speech.

If such a handshake procedure in-between a newly connected device and the speech unit is not performed, only a basic functionality of the device is provided by some user-network-commands stored in the initial vocabulary contained in the speech unit that matches to the user-network-commands of said device. It is also possible that user-network-commands used for other devices can be adapted to the new device, but the full controllability by speech cannot be guaranteed in this way. Still the speech unit has to know the ID of said device to have an access, so some kind of communication in-between the speech unit and the device or another device knowing the ID has to take place.

Commands that include media descriptions, e.g., the name of a CD, song titles, movie titles, or station names induce vocabularies that are in part unknown to the speech unit. Hence, this information has to be acquired from other sources. Current state of the art is that the user enters this information by typing or spelling. The speech unit according to the invention, on the other hand can dynamically create the vocabulary and/or grammars similar to the processes as described above. The name and/or pronunciation of a media description or program name is acquired in one of the following ways:

From a database delivered by someone on some media, e.g. CD-ROM;

the medium, e.g. CD, Digital Video Broadcast (DVB), itself holds its description and optionally also the pronunciation of its description, e.g. artists names and song titles are machine readable included on a CD;

from a database accessed over an information transport mechanism, e.g. the internet, Digital Audio Broadcast (DAB), a home network, telephone lines. Besides these methods the user might enter it by typing or spelling.

To acquire such information, the speech unit or any other device issues an information seeking request asking for the content of a medium or a program, e.g., when a new CD is inserted in a player for the first time, when a device capable of receiving programs is attached to the bus, to other connected devices, e.g. all devices of the home network. There might be more than one device that tries to answer the request. Possible devices might be for example:

A device capable of reading a delivered database, e.g. a CD-ROM contained in a disc jukebox, a video tape player telling the content of the tape, a data base that has been entered by the user, e.g. on his PC, a set top box telling the channels, i.e. program names, it can receive;

a device connected to another information transport mechanism, e.g. a WEB-TV, a set-top-box, a DAB receiver, a PC, that at least sometimes is connected to the internet or has a modem to connect to a system holding program channel information or other information;

a device communicating with the user that queries a content, e.g. by asking him/her how a frequently played song is called, what program he is currently watching, etc., a dialogue initiated by the user about a newly bought media and the wish to enter the titles by typing, spelling or speaking.

FIG. 12 shows an example for the interaction of multiple devices for vocabulary extensions concerning media contents. The information is delivered by neither the speech unit nor the device holding the media in this case. After a new medium is inserted for the first time in a media player, the media player sends a notification of insertion of medium X to the speech unit. The speech unit then sends a content query for medium X in form of a control-network-command to the media player and to all other connected network devices. One of the other connected network devices sends thereafter the content information for medium X to the speech unit. The speech unit updates its vocabulary and sends an acknowledge receipt to the media player and the other connected network device that has sent the content information for medium X. The medium content can now be accessed by spoken-commands, e.g. play Tschaikowsky Piano Concert b-minor.

FIG. 13 shows another example for the interaction of multiple devices for vocabulary extension concerning media contents. In this case two devices answer the query. The first answer is chosen to update the vocabulary while the second answer is discarded.

After a new medium is inserted for the first time in a media player, the media player sends a notification of insertion of medium X in form of a control-network-command to the speech unit. The speech unit sends then a content query for medium X to the media player and all other connected network devices. In this case the media player sends the content information for medium X, since the content description is entailed on the medium. The speech unit then updates its vocabulary and/or grammars and sends an acknowledge receipt in form of a control-network-command to the media player. If the content information for medium X is thereafter delivered by another connected network device, the speech unit discards this information.

It might also be possible that a database delivered on some medium, e.g. a CD-ROM, or a database stored in the internet, i.e. an internet page, or transmitted via digital broadcasting contains the user-network-commands and corresponding vocabulary and/or grammars of a remotely controllable network device, in this case this information can be downloaded by the speech unit 2 like the media descriptions, e.g. when a new device 11 is connected to the network or when a user initiates a vocabulary update. Such devices need not to carry this information in a memory, but it can be delivered with the device 11 on a data carrier that can be read by another device 11 connected to the network or it can be supplied by the manufacturer of the device via the internet or digital broadcasting.

We claim:

1. Speech unit for generating user-network-commands according to electric signals provided by a microphone to control a remotely controllable device connected to said speech unit, characterized by;
   a control unit in said speech unit to send control-network-commands to said device connected to said speech unit so that said device transmits device or medium dependent vocabulary and/or grammars and corresponding user-network-commands to said speech unit and to receive data and messages from said device; and
   a memory to store said device or medium dependent vocabulary and/or grammars and corresponding user-network-commands transmitted by said remotely controllable device connected to said speech unit,
   said speech unit generates and stores in said memory, new user-network-commands and corresponding vocabulary to control said remotely controllable device based on a dialogue between said speech unit and a user.

2. Speech unit according to claim 1, characterized by an interface connected to a network system to which a remotely controllable device can be connected that can be controlled via said network system, to send generated user-network-commands and control-network-commands via said network system to said remotely controllable device and to receive data and messages from said remotely controllable device.

3. Speech unit according to claim 2, characterized in that said control unit determines what kind of devices are connected to a network system, to send said control-network-commands to said devices, and to receive data from said devices.

4. Speech unit according to claim 1, characterized in that said device is wired or wireless connected to said, speech unit.

5. Speech unit according claim 1, characterized by a memory to initially store general vocabulary and grammars based on which general user-network-commands are generated.

6. Speech unit according to claim 1, characterized by a speaker recognition section to identify different users according to said electric signals provided by said microphone to be able to generate speaker dependent user-network-commands.

7. Speech unit according to claim 1, characterized by a speech synthesizer to synthesize messages from said device and from said speech unit itself and to output them to a user via a loudspeaker.

8. Speech unit according to claim 1, characterized by a microphone and/or a loudspeaker.

9. Speech unit according to claim 1, characterized in that said microphone and/or a loudspeaker are/is remotely connected to said speech unit either wired or wireless either direct or via a network.

10. Speech unit for generating user-network-commands according to electric signals provided by a microphone to control a remotely controllable device characterized by an interface connected to a network system to which said remotely controllable device is connected that can be controlled via said network system, to send generated user-network-commands via said network system to said remotely controllable device and to receive data and message from said remotely controllable device, said user-network-commands are requested by control-network-commands from a control unit in said speech unit, said speech unit generates and stores in a memory, new user-network-commands and corresponding vocabulary to control said remotely controllable device based on a dialogue between said speech unit and a user.

11. Speech unit according to claim 10, characterized in that said interface is connected to said network system via a public telephone network.

12. Speech unit according to claim 10, characterized in that said interface is connected to said network system via another network system.

13. Remotely controllable device, comprising:
   a first control unit to extract user-network-commands directed to said device and to control the functionality of said remotely controllable device according to said extracted user-network-commands, characterized in that said first control unit also extracts control-network-commands directed to said remotely controllable device, said control-network-commands are sent by a second control unit in a speech unit, and, according to said extracted control-network-commands, controls the transmission of device dependent user-network-commands and corresponding vocabulary and/or grammars stored in a memory of said remotely controllable device useable by said speech unit connected thereto to convert spoken-commands from a user into user-network-commands to control the functionality of said remotely controllable device, said speech unit generates and stores in said memory, new user-network-commands and corresponding vocabulary to control said remotely controllable device based on a dialogue between said speech unit and said user.

14. Remotely controllable device according to claim 13, characterized by an interface connected to a network system to which said device and said speech unit can be connected to receive and transmit commands, data and messages.

15. Remotely controllable device, comprising:
   a first control unit also extracts control-network-commands directed to said device and to control the functionality of said remotely controllable device according to said extracted user-network-commands, characterized in that said first control unit also extracts control-network-commands directed to said remotely controllable device, said control-network-commands are sent by a second control unit in a speech unit, and, according to said extracted control-network-commands, controls the transmission of medium dependent user-network-commands and corresponding vocabulary and/or grammars stored on a medium accessable by said remotely controllable device useable by said speech unit connected thereto to convert spoken-commands from a user into a user-network-commands to control the functionality of said remotely controllable device in regard to said accessable medium or to control the functionality of said or another remotely controlled device, said speech unit generates and stores in a memory, new user-network-commands and corresponding vocabulary to control said remotely controllable device based on a dialogue between said speech unit and said user.

16. Remotely controllable device according to claim 15, characterized in that said medium accessable by said remotely controllable device is a compact disc.

17. Remotely controllable device according to claim 15, characterized in that said medium accessable by said remotely controllable device is an internet page or information page transmitted via digital broadcasting.

18. Method of self-initialization of a speech unit connected to a remotely controllable device, comprising the following steps:
   a) send a control-network-command from a control unit in said speech unit to said remotely controllable device to control said device to transmit device or medium dependent user-network-commands to control said device and the corresponding vocabulary and/or grammars;
   b) receive said device or medium dependent user-network-commands and the corresponding vocabulary and/or grammars from said device;
   c) update vocabulary and/or grammars and the corresponding user-network-commands in a memory; and
   d) generate and store in said memory new vocabulary and/or grammars and corresponding user-network-commands based on a dialogue between said speech unit and a user.

19. Method according to claim 18, charaterized by the following steps:
   ask for a logical name or identifier of said device offering the device dependent user-network-commands and the corresponding vocabulary and/or grammars;
   receive logical name or identifier; and
   assign vocabulary and grammars and corresponding user-network-commands for said device to the received logical name or identifier when said vocabulary and/or grammars and the corresponding user-network-commands are updated in said memory in order to create device dependent user-network-commands.

20. Method according to claim 19, characterized in that said logical name of said device is either determined by a user or by said device itself.

21. Method according to claim 19, characterized in that said identifier includes address and name of said device.

22. Method according to claim 18, characterized by the following steps:
   send a control-network-command to identify a user dependent mapping for the vocabulary and/or grammars and corresponding user-network-commands;
   receiving at least one of a name, an identifier, and a speech sample of a user that the dependency should be created for; and assign the vocabulary and/or grammars and corresponding user-network-commands for said device to a received name or names, an identifier or identifiers or speech sample of said user when said vocabulary and/or grammars and the corresponding user-network-commands are updated in said memory in order to create user dependent user-network-commands.

* * * * *